A. REAGAN.
GRAIN-FORKS.
No. 193,724. Patented July 31, 1877.
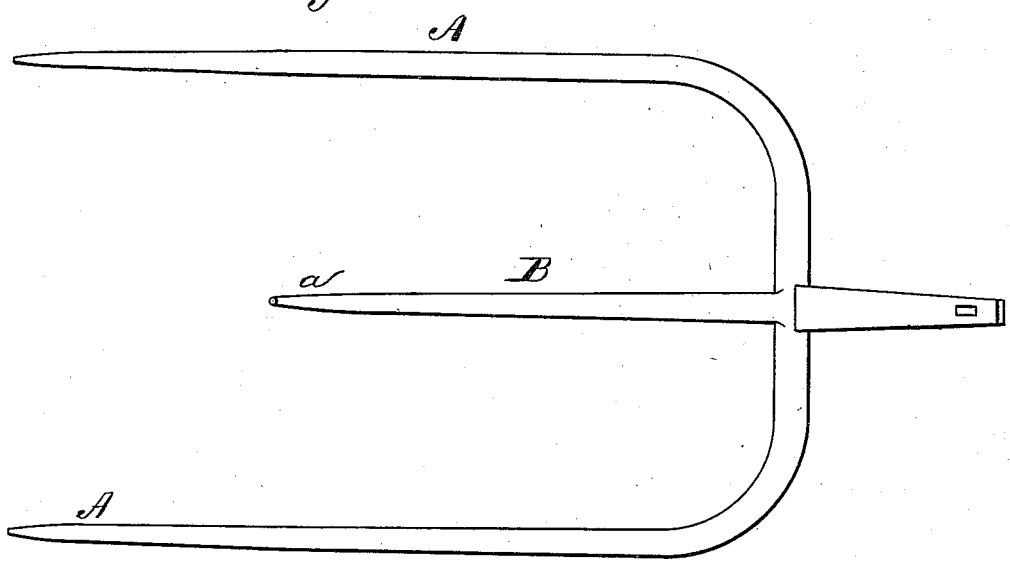
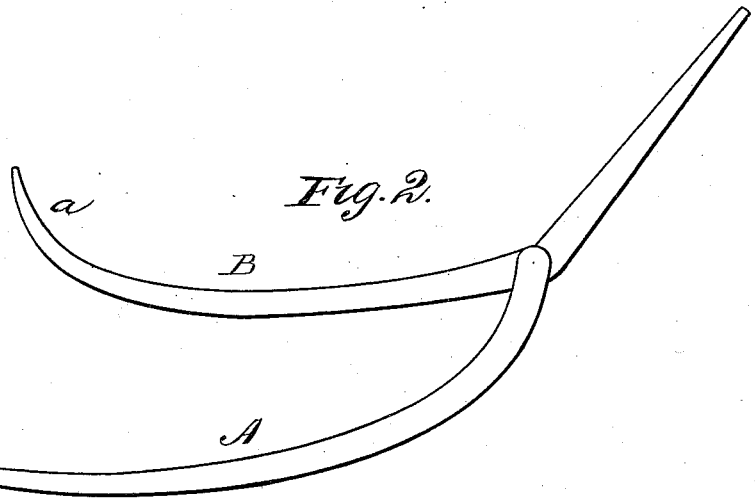
WITNESSES
INVENTOR
ATTORNEY

UNITED STATES PATENT OFFICE.

AHIMAAS REAGAN, OF SALISBURY, MISSOURI.

IMPROVEMENT IN GRAIN-FORKS.

Specification forming part of Letters Patent No. 193,724, dated July 31, 1877; application filed May 26, 1877.

*To all whom it may concern:*

Be it known that I, AHIMAAS REAGAN, of Salisbury, State of Missouri, have invented a new and valuable Improvement in Grain-Forks; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of my improved grain-fork, and Fig. 2 is a side view thereof.

This invention has relation to improvements in forks for pitching and stacking oats, wheat, and the like; and it consists in combining, with the lateral tines of the fork, an intermediate prong or tine, that extends upward obliquely from the said lateral tines, whereby means are provided for gathering up and keeping the bunches of grain or oats straight, as will be hereinafter more fully set forth.

In the annexed drawings, the letter A designates the two side tines or prongs of a grain-fork, and B an intermediate tine or prong. These tines will be made of steel of proper quality, and the side tines will be of the usual length and form. The center prong B extends from the heel of the lateral prongs obliquely upward above the plane thereof, and has its extreme outer end upturned, as shown at *a*, nearly in hook form, for a purpose hereinafter fully explained.

The middle prong B forms with prongs A an annular space, whereby, when the fork is thrust under a bunch of oats or wheat, the said bunch will be forced between said tines and be there held, the center tine bearing the straw upon the side tines instead of on the middle tine, and balancing and fastening it equally on both sides until pitched upon a stack, a wagon, or into the mow, where it will fall straight. The upturned end of the middle tine B directs the grain between it and the lateral tines, and the latter will be under the bunch and the former over the same, so that the grain is crowded between the tines in the act of gathering up a bunch, and there is no danger of its casually falling out.

By this means the necessity of straightening and gathering up the grain by hand is obviated, and the frequent wounding of the operator, by thistles or thorns intermingled with the grain, avoided. Also, in taking up the grain after a reaper, it does away with the usual mode of binding up the sheaves, and is thus a great saving of time and labor.

By using my improved fork the grain may be gathered up straight, in bunches proportioned to the size of the fork, and loaded upon the wagon, or made into a stack in the same condition; or it may be unloaded from the wagon onto a rick or mow, in the same condition. Being straight, the grain, when formed into a stack, will form a thatch impervious to water, and fermentation or molding of the grain will be absolutely prevented.

I am aware that it is not new to construct a fork with an upturned prong. Therefore, I do not claim such a device, broadly.

What I claim as new, and desire to secure by Letters Patent, is—

The grain-fork consisting of the consecutive spaced tines A, having intermediate thereto a tine, B, projecting up above the level of said tines A, and having a recurvate end, the whole formed in one piece, substantially as specified.

In testimony that I claim the above I have hereunto subscribed my name in the presence of two witnesses.

AHIMAAS REAGAN.

Witnesses:
C. H. WOODSON,
HARRY HARKALCOTT.